United States Patent [19]

Trainer et al.

[11] Patent Number: 5,215,418
[45] Date of Patent: Jun. 1, 1993

[54] SINGLE DIRECTION TOGGLE ANCHOR

[75] Inventors: Teddy N. Trainer; Thomas A. Bartz, both of Charles City, Iowa

[73] Assignee: Diversified Fastening Systems, Inc., Charles City, Iowa

[21] Appl. No.: 915,280

[22] Filed: Jul. 20, 1992

[51] Int. Cl.⁵ .................. F16B 21/00; F16B 39/00
[52] U.S. Cl. .................. 411/345; 411/340; 411/169; 411/973
[58] Field of Search ........... 411/169, 340, 344, 345, 411/346, 973, 340, 344, 345, 346

[56] References Cited

U.S. PATENT DOCUMENTS

| 156,198 | 10/1874 | Wood | 411/340 X |
| 687,809 | 12/1901 | Wrigley | 411/346 |
| 1,168,257 | 1/1916 | Kennedy | 411/346 |
| 1,340,470 | 5/1920 | Whitmore | 411/345 |
| 3,127,808 | 4/1964 | Drybread, Sr. | 411/346 |
| 3,861,268 | 1/1975 | Jaggers | 411/340 |
| 4,406,108 | 9/1983 | Beck et al. | 411/340 X |

FOREIGN PATENT DOCUMENTS 441319  8/1949  Italy ................... 411/346

Primary Examiner—Neill R. Wilson
Attorney, Agent, or Firm—G. Brian Pingel

[57] ABSTRACT

A toggle anchor for securing various types of articles to masonry or concrete walls and having a body portion and a retainer bar that is pivotally attached to the body portion and is sized so that it pivots with respect to the body portion in only one direction.

8 Claims, 2 Drawing Sheets

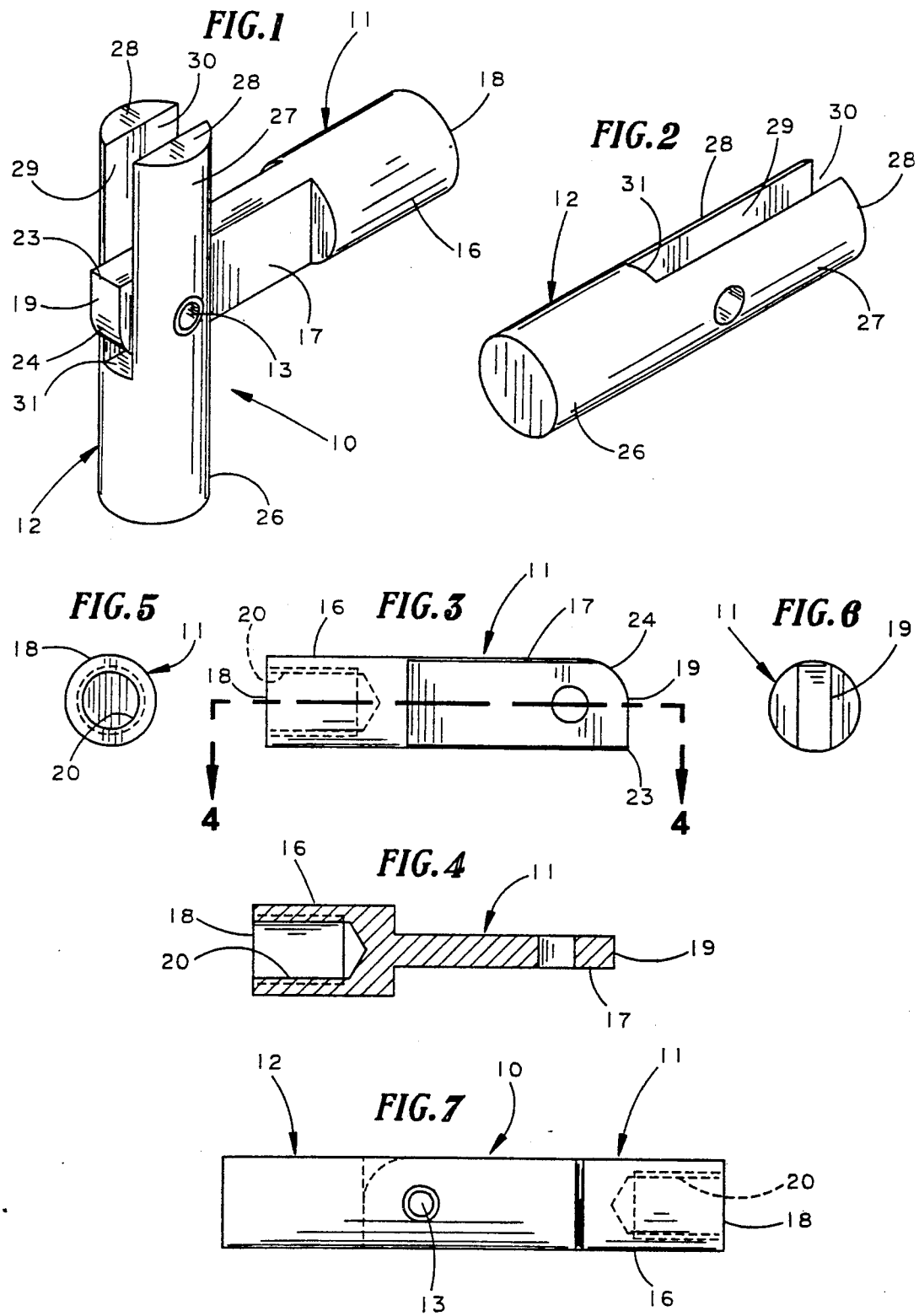

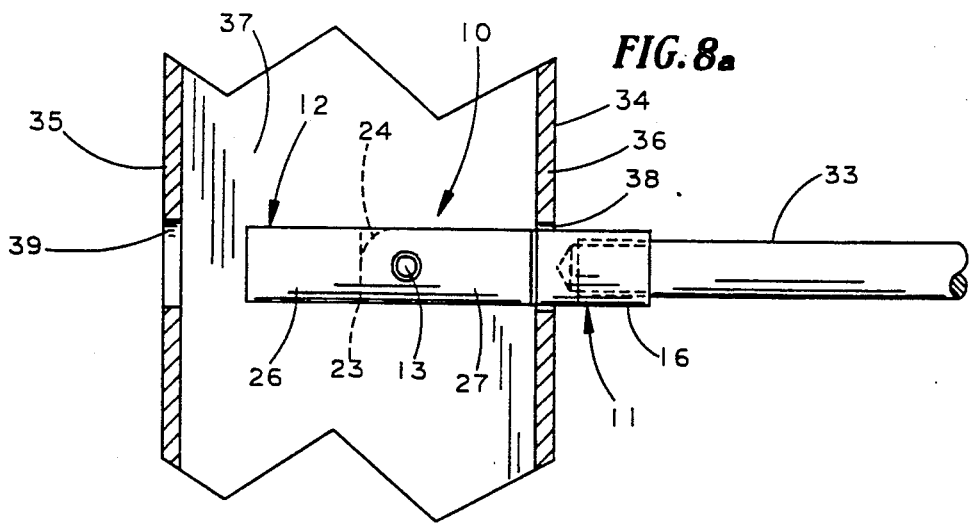
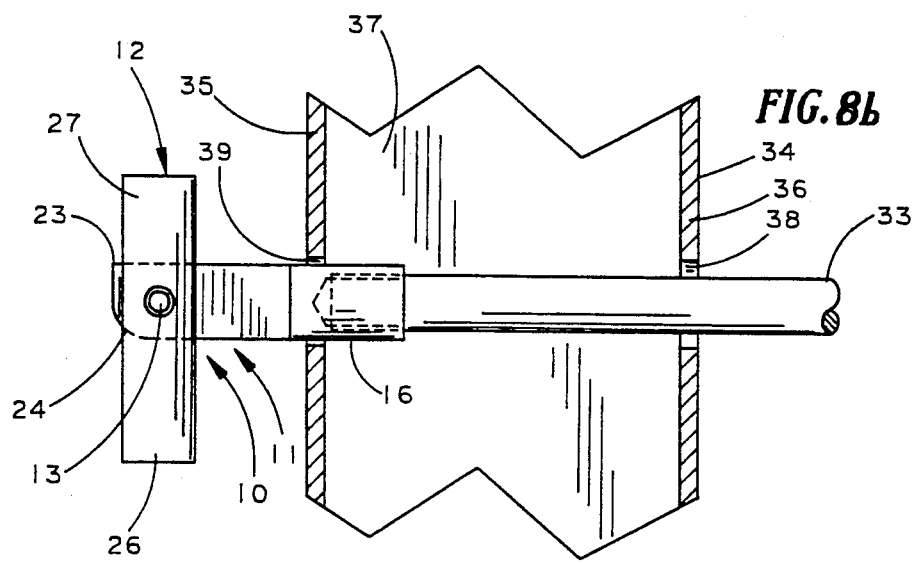
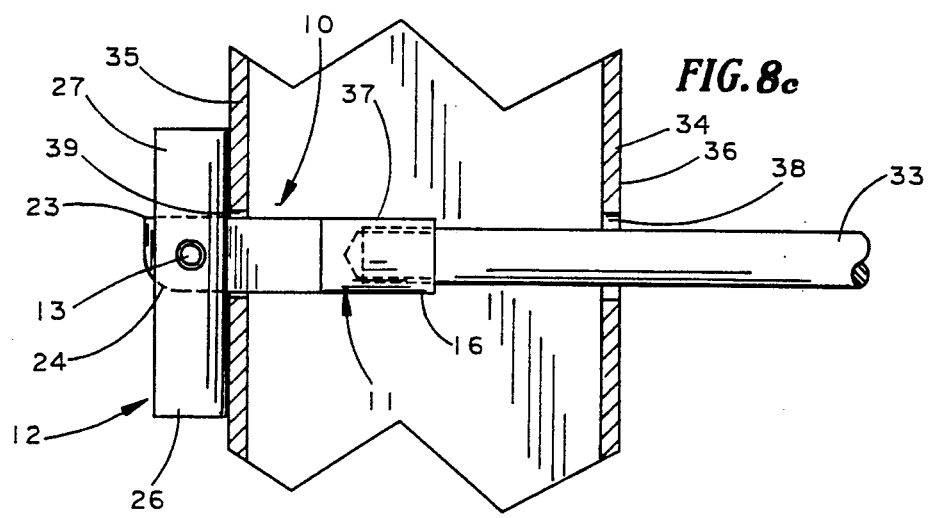

SINGLE DIRECTION TOGGLE ANCHOR

BACKGROUND OF THE INVENTION

1. Field of the Invention

The present invention relates in general to wall anchors having pivoting retainer bars that serve to secure the anchors in walls, and more specifically relates to a toggle anchor that is designed to be utilized with walls having hollow portions through which the anchor must traverse without the retainer bar pivoting into a securement position.

2. Description of the Prior Art

Toggle anchors for masonry or concrete walls are well known in the art. A standard toggle anchor includes a body portion having a retainer bar pivotally attached to its inner end. In usage, a hole is drilled through the wall in which the anchor is desired to be secured. The anchor is then positioned into the hole and moved inward until the retaining bar is through the wall and free thereof so that it then pivots into a securing position. These types of anchors are relatively easily installed and operate effectively to secure the anchor in the wall.

The above described prior art anchors have a major disadvantage in that they are not useable with hollow core walls when it is desired for the anchor to pass completely through the wall. In such instances, as the anchor is pushed through the outer side of the wall and reaches the hollow core, the retaining bar pivots and does not thereafter permit the anchor to pass through the opposite inner side of the wall.

The present invention is specifically designed to be used with walls having hollow portions so that the anchor can pass through such portions without pivoting of the retaining bar until the anchor is completely through the wall.

SUMMARY OF THE INVENTION

The present invention provides a single direction toggle anchor for securing various types of articles to masonry or concrete walls. The anchor includes a body having a threaded head section and a shank section and a retainer bar that is pivotally connected to the body. The retainer bar is generally divided into a weighted section and a bifurcated section formed of a pair of spaced apart arms with a slot therebetween. The body shank section is received in the retainer bar slot and is sized with respect to such slot so that the retainer bar is permitted to pivot in only one direction with respect to the body.

In a preferred embodiment, a pivotal connection between the body shank and the retainer bar is proximate to the weighted section of the bar, and the shank outer end has a rounded side edge and an opposite right angle edge that prevents pivoting of the retainer bar in more than one direction. The retainer bar arms are parallel to one another such that the slot therebetween has a uniform width and the body shank section is flattened so as to have a thickness sized to fit within said slot. Thus, as the toggle anchor is directed into a wall, the shank section is substantially receivable within said slot.

BRIEF DESCRIPTION OF THE DRAWINGS

FIG. 1 is a perspective side view of a preferred embodiment of the toggle anchor of the present invention that includes a body and a retainer bar;

FIG. 2 is a perspective view of the retainer bar of the toggle anchor of FIG. 1;

FIG. 3 is a side view of the body of the toggle anchor of FIG. 1;

FIG. 4 is a cross-sectional view taken along the line 4—4 of FIG. 3;

FIG. 5 is an outer end view of the body of FIG. 1;

FIG. 6 is an inner end view of the body of FIG. 1;

FIG. 7 is a side view of the anchor of FIG. 1 with the retainer bar axially aligned with the body;

FIGS. 8a, 8b and 8c are depictions of the anchor of FIG. 1 as it is directed through a hollow core wall and into a securement position.

DETAILED DESCRIPTION OF THE PREFERRED EMBODIMENT

Referring now to FIG. 1, a preferred embodiment of a single direction toggle anchor of the present invention is shown generally at 10. Although toggle anchors have been known in the art for many years, the toggle anchor 10 is particularly designed to be utilized with masonry or concrete walls having hollow cores to permit the anchor 10 to be positioned through such hollow cores and secured against the innermost wall side. As shown in FIG. 1, the anchor 10 is formed of a body 11 and a retainer bar 12 that is pivotally attached to the body 11 at 13.

The body 11 includes a head section 16 and a shank section 17 so that the body has a head end 18 and a shank end 19. The body head section 16 is shown in FIGS. 3, 4 and 7 as having an interior threaded cavity 20 extending inwardly from the head end 18. This form of construction of the head section 16 is not essential to the present invention and instead the head section 11 could include a threaded post that would serve as a male connecter.

The shank section 17 forms slightly greater than one-half of the body 11, is generally rectangular in shape and has a thickness sized to mate with the retainer bar 12. The shank end 19 includes a right angle corner 23 and a curved corner 24 for a purpose as will be described below.

The retainer bar 12 is formed of a weighted section 26 and a bifurcated section 27. The bifurcated section 27 includes a pair of parallel arms 28 that are spaced apart from one another to form a slot 29 having an open end 30 and a closed end 31. The thickness of the slot 29 is slightly larger than the body shank section 17 and the length of the slot 29 is longer than the length of the shank section 17 so that such section 17 can be fully received within the slot 29 when the body 11 and retainer bar 12 are in a collinear alignment for insertion into a wall.

The section 26 is referred to as a "weighted" section only with respect to the fact that it is somewhat heavier than the bifurcated section 27 due to the fact that the slot 29 is formed in such section. Consequently, the retainer bar 12 has a tendency to pivot into a position perpendicular to the body 11 with the weighted section 26 at the bottom and the bifurcated section 27 at the top.

Known toggle anchors have retainer bars that will pivot about the connection 13 in two directions so that whenever the axis of the connection 13 is disposed horizontally, pivoting of the retainer bar 12 will occur. In contrast to such prior art devices, the retainer bar 12 will pivot about the connection 13 in only one direction. This is because of the right angle corner 23 on the shank 17 and the disposition of the shank 17 in the slot 29 whereby the shank end 19 is located proximate to the slot closed end 31 so that the corner 23 engages the slot closed end 31 to prevent pivoting in the opposite direction. Such limitation in the pivoting action of the retainer bar 12 is particularly useful in connection with the installation of the anchor 10 in hollow core walls.

As illustrated by FIGS. 8a-8c, the anchor 10 is shown in association with an extension rod 33 that is mated with the body 11 and is chosen to be longer than the thickness of a hollow core wall 34 having inner and outer sides 35 and 36 respectively and a hollow core 37. To install the anchor 10 through the wall 34, the anchor is aligned with the right angle corner 23 of the shank 17 at the bottom of the anchor 10 so that the anchor 10 is in a nonpivoting orientation. The anchor 10 is then directed through a hole 38 in the outer wall side 36 to reach the position shown in FIG. 8a wherein it is within the wall hollow core 37. Next, the anchor 10 is directed through a hole 39 in the inner wall side 35 to pass completely through the wall 34, as shown in FIG. 8b. At this time, the anchor 10 is rotated one hundred eighty degrees so that the right angle corner 23 is located to the top of the anchor 10 and the curved corner 24 is located at the bottom. In such position, the retainer bar 12 will pivot ninety degrees to become perpendicular to the body 11 and parallel with the wall 34 so that the anchor 10 cannot thereafter be pulled back through the holes 38 and 39 as indicated by FIG. 8c.

Another important advantage provided by the anchor 10 is that it can readily be removed if desired. Removal is accomplished simply by rotating the anchor 10 one hundred eighty degrees into its nonpivoting position. As the anchor 10 is rotated, the retainer bar 12 will move from its pivoted position into a collinear alignment with the body 11 and, thereafter, the anchor 10 can easily be pulled back through the holes 38 and 39.

Thus, the present invention provides an improved toggle anchor construction that enables installation and removal from hollow core walls. Although the anchor 10 has been described according to the preferred embodiment, it should be clear to those skilled in the art that the particular configuration of the anchor 10 disclosed herein can be modified in various respects without departing from the true spirit of the present invention.

I claim:

1. A single direction toggle anchor for securing various types of articles to masonry or concrete walls, said anchor comprising:
   (a) a body having a threaded head section and a shank section;
   (b) a retainer bar that is generally divided into a weighted section and a bifurcated section formed of a pair of spaced apart arms and a slot therebetween sized to receive the body shank section;
   (c) means for pivotally connecting the outer end of said body shank section within said retaining bar bifurcated section whereby said body is pivotable with respect to said retaining bar from a closed position in which said body and said retaining bar are generally collinear, to an open position in which said body and said retaining bar are orthogonal; and
   (d) said bifurcated section slot and said shank are formed to permit pivoting of said retaining bar with respect to said body in only one direction.

2. A toggle anchor as recited in claim 1 wherein said retainer bar arms are parallel to one another so that said slot therebetween has a uniform width and said body shank section is flattened so as to have a thickness sized to fit within said slot.

3. A toggle anchor as recited in claim 2 wherein the connection between said shank outer end and said bifurcated section is proximate to the weighted section of said retainer bar.

4. A toggle anchor as recited in claim 4 wherein the shank section is substantially received within said slot when said body and said retainer bar are collinear 5. A toggle anchor as recited in claim 1 wherein said retainer bar is rod shaped.

6. A toggle anchor as recited in claim 1 wherein said shank outer end has a rounded side edge and an opposite right angle edge and is located proximate to one end of said slot so that said right angle edge engages said end of the slot to prevent pivoting of said retainer bar in the opposite direction.

7. A toggle anchor as recited in claim 1 wherein said body head section is rod shaped.

8. A toggle anchor as recited in claim 1 wherein said body head section has a threaded internal cavity.

* * * * *